June 18, 1929.  R. CALVERT  1,717,661
REVIVIFICATION OF USED KIESELGUHR
Filed Oct. 25, 1924
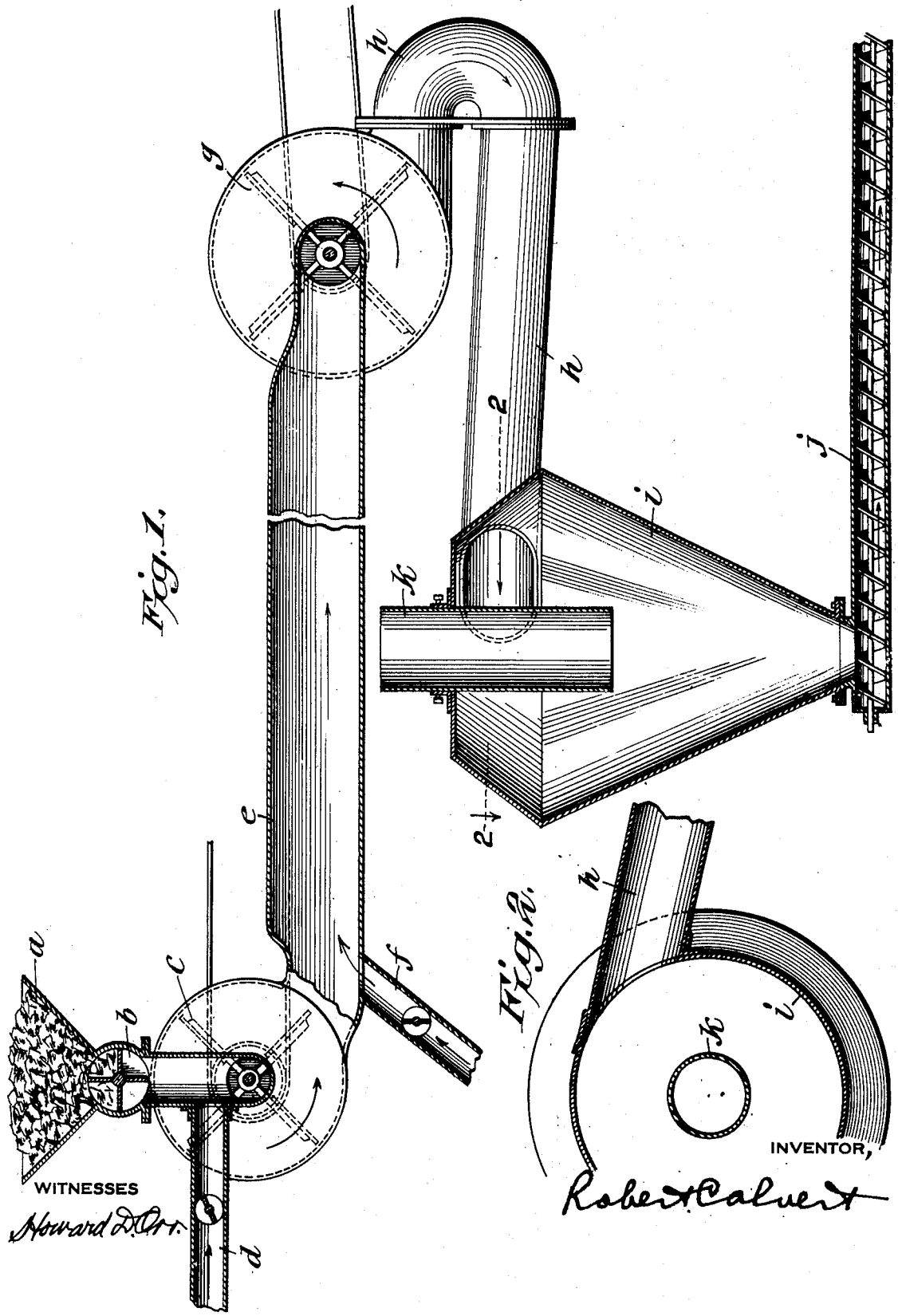
INVENTOR,
Robert Calvert
WITNESSES
Howard D. Orr Patented June 18, 1929.

1,717,661

UNITED STATES PATENT OFFICE.

ROBERT CALVERT, OF LOMPOC, CALIFORNIA.

REVIVIFICATION OF USED KIESELGUHR.

Application filed October 25, 1924. Serial No. 745,766.

My invention relates to a process of revivification of kieselguhr which has been contaminated by impurities retained by it during the process of filtration, through it, of solutions of raw cane sugar or other materials.

Briefly, my invention consists in finely disintegrating such filter cake in a stream of hot gas or air at a temperature so high as to oxidize the organic impurities clinging to the microscopic particles of kieselguhr.

Calcination has been suggested previously as a means of destroying the organic impurities of filter press cake. Nevertheless, tens of thousands of tons yearly of kieselguhr are mined and prepared at considerable cost, shipped by freight across a continent, and then discarded after use just once in filtering sugar solutions. Some sugar refineries, indeed, pay freight for hauling the once-used kieselguhr to a dumping place.

The difficulties which have retarded the use of the calcination process for recovering this kieselguhr are several. First, the filter cake is quite wet, with a water content of about 70%, and is liable to stick to slow-moving recovery equipment, such as a rotary cement kiln. Second, the wet cake tends to form lumps during drying. These lumps are excellent heat insulators. A very high temperature is reached, therefore, at the outer surface before the inner part or core of the lump is brought to the kindling temperature of the organic impurities there present.

The net results of the steep temperature gradient from the outside to the inside of the lump is either under-heating of the center or over-heating of the exterior.

In my process, I disintegrate the filter cake, in the presence of extremely hot air. The degree of dispersion and the prevailing temperature are so chosen that the particles are dried and brought almost instantaneously to the ignition point of the organic impurities. It should be remembered that fossil diatoms average less than 100 mu or 0.004 inch in the longest dimension. The thickness of the particle is still less. In addition, the thin microscopic fossil diatoms have numerous pores which give still better access of the heated air used in my process to the impurities which are to be oxidized.

In the accompanying drawing, which illustrates a form of the apparatus to be used in carrying out the process:—

Figure 1 is a side elevation, partly in section; and

Figure 2 is a horizontal section on the line 2—2 of Fig. 1.

As illustrated in the drawing, I feed the filter cake $a$ either as the cake comes from the sugar refineries or after centrifuging to remove an additional quantity of water, through a feeder, $b$, designed to exclude air, to a strongly constructed, electrically driven fan, $c$, oprearing at 1000 to 2000 R. P. M. The fan is encased in a suitable metal housing and delivers into a metal pipe line or reaction chamber, $e$. Besides the wet filter cake, there is supplied through the pipe, $d$, to the inlet of the fan, $c$, heated air or flue gas, at such temperature and in such volume that the temperature of the fan is maintained at some temperature above the boiling point of water, say, at 350° C. This temperature produces an exceedingly rapid evolution of steam from the microscopic particles of disintegrated cake, and decreases whatever tendency might otherwise exist for the particles to adhere to the rapidly moving fan blades.

Under some conditions, particularly with relatively dry filter cake as the raw material, sufficient heat may be supplied through $d$ to raise the temperature to the point at which the organic matter is rapidly oxidized, say 500° C. I prefer, however, to supply additional heat, as through $f$, after the filter cake has been through the disintegrating fan. For this purpose there is used also an exhauster fan $g$. This fan draws not only the dust, steam, and heated air which have passed through the first fan, but also an additional quantity of very hot flue gas which is admitted to the line at a point so as to mix with the products from the first fan, approximately at the outlet of that fan.

In this way there is a completion of the drying and of the combustion in a very hot zone. This arrangement protects the first fan from handling the extremely hot gas. Further, the gases are so cooled by the evaporation of moisture from the particles of the filter cake that the fan blades of the exhauster will not be heated to the softening temperature. At the same time, a proper regulation of feed will make possible a minimum temperature, at the entrance to the second fan, of 400° C., at which temperature the minute particles of organic matter, in intimate contact with gas containing free oxygen, are oxidized quickly.

After passing the second blower, the dust is then separated from the gas, as by blowing through the pipe $h$, into the metal cyclone, $i$, (Figs. 1 and 2). The air goes out from the center of the cyclone through the pipe, $k$, and the dust at the bottom to the screw conveyor, $j$, to an inclined, rotary pipe cooler, to a packer, or directly to the place of re-use.

This invention is not limited to this or any type of apparatus, but only to the process of suspension of filter press cake in a stream of air or oxygen-containing gas at such a temperature and for such a time that the organic impurities are either oxidized completely or so decomposed as to be innocuous in the recovered kieselguhr. The use of water-cooled fan bearings is typical of certain engineering details which should be obvious. Also, higher temperatures than those specified may be used, in which case a shorter time of contact between the gas and the filter cake will suffice to ignite the impurities.

I may apply the process to other filter cakes than those of sugar refineries, and I intend the words "filter cake" to mean diatomaceous earth which has been contaminated, during use as a filtration material, by combustible impurities.

The sizes of blowers and pipe lines will be proportioned to the tonnage of filter cake treated per hour. To treat one ton (dry weight) of filter cake an hour, I may use approximately these conditions: first blower, capacity 10,000 cu. ft. air per minute; pipe line or reaction chamber, of iron or ceramic ware, 50 feet long by 3.0 ft. in diameter at its widest point; second, exhauster blower, capacity 30,000 cu. ft. air per minute; gas temperature 400° C. in the outlet from the second fan; cyclone, of usual type, 12 ft. across at the widest point, with air discharge pipe of 3 ft. diameter leading out of the top.

It may be convenient to arrange vertically the pipe line connecting the delivery of the first blower to the inlet of the second blower, in such way that any undried or heavy particles will not be blown upward and away from the drying and firing zone as quickly as the dry and lighter particles. In fact, it may be desirable in some cases to provide a vertical fire brick stack, with the one fan delivering a stream of disintegrated filter cake and hot air upward at the bottom of the stack, a furnace supplying an additional quantity of hot flue gas (at say 1100° C.) into the bottom of stack, just above the delivery from the lower fan, with a second fan exhausting the dust and gas mixture from the top of the stack and delivering to a dust separator as described above.

I claim:—

1. The process of revivification of wet filter cake from sugar refineries by suspension in hot gas.

2. The process of revivification of wet filter cake from sugar refineries by suspending in a stream of hot gas.

3. The process of revivification of wet filter cake from sugar refineries by disintegrating the filter cake in a stream of hot gas.

4. The process of revivification of wet filter cake from sugar refineries by disintegrating the filter cake in a stream of gas of such temperature as to dry the filter cake and also heat the filter cake to the kindling temperature of the organic compounds present.

5. The process of revivification of wet filter cake from sugar refineries which consists in disintegrating the filter cake in a stream of oxygen-containing gas of such temperature as to dry the filter cake and also oxidize the organic compounds present in the filter cake.

6. The process of revivification of wet filter cake from sugar refineries which consists in disintegrating the filter cake in the presence of an oxygen-containing gas at such temperature and in such volume that the temperature of the mixture of disintegrated filter cake and gas, after evaporation of the water contained in the filter cake, will be at least 400° C.

7. The process of revivification of wet filter cake from sugar refineries which consists in blowing the disintegrated filter cake, with heated gas, into a chamber into which additional heated gas is admitted, and then separating the dust from the gas.

8. The process of revivification of wet filter cake from sugar refineries which consists in disintegrating the filter cake in the presence of hot gas, and keeping the finely divided filter cake suspended in the gas until the organic impurities have been so changed chemically that the filter cake is rendered suitable for re-use as a filtration material.

9. The process of revivification of wet filter cake from sugar refineries which consists in disintegrating the filter cake by means of a blower, in a stream of hot gas, containing oxygen, blowing into a chamber maintained at a higher temperature than prevails in the first-mentioned blower, exhausting the chamber with a second blower, and then separating the dust from the gas.

10. The process of revivification of wet filter cake from sugar refineries which consists in suspending disintegrated filter cake in hot gas, containing some oxygen, the temperature of the mixture after completion of the drying of the filter cake being at least 400° C.

11. The process of revivification of wet filter cake from sugar refineries which consists of drying and calcining the filter cake, without milling subsequent to drying and previous to calcination.

12. The process of revivification of wet filter cake from sugar refineries which consists in disintegrating the wet filter cake in the presence of an oxygen containing gas at 400° C., blowing into a pipe line to which is admitted sufficient additional heated gas to insure the evaporation of substantially all of the water from the filter cake and the combustion of the organic compounds present.

13. The process of recovering, for re-use as a filtration material, diatomaceous earth which has been used in the filtration of raw sugar solution, which consists in igniting the filter cake at a temperature below the vitrification point of the clay, contained in the diatomaceous earth, but sufficiently high to destroy the organic compounds retained from the sugar filtration.

In testimony, that I claim the foregoing as my own, I have hereto affixed my signature.

ROBERT CALVERT.